(12) United States Patent
Hoffmann

(10) Patent No.: US 10,652,088 B2
(45) Date of Patent: May 12, 2020

(54) CONTROLLING OF COMMUNICATION NETWORK COMPRISING VIRTUALIZED NETWORK FUNCTIONS

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 261 days.

(21) Appl. No.: 15/907,455

(22) Filed: Feb. 28, 2018

(65) Prior Publication Data

US 2018/0191567 A1 Jul. 5, 2018

Related U.S. Application Data

(62) Division of application No. 15/112,039, filed as application No. PCT/EP2014/050910 on Jan. 17, 2014, now Pat. No. 10,523,505.

(51) Int. Cl.
*H04L 12/24* (2006.01)
*G06F 16/951* (2019.01)
(Continued)

(52) U.S. Cl.
CPC .......... *H04L 41/0813* (2013.01); *G06F 9/442* (2013.01); *G06F 9/45558* (2013.01);
(Continued)

(58) Field of Classification Search
CPC ... H04L 41/0813; H04L 41/12; G06F 16/951; G06F 9/442; G06F 9/45558; G06F 9/485;
(Continued)

(56) References Cited

U.S. PATENT DOCUMENTS

| 8,745,221 B1 | 6/2014 | Willbanks |
| 9,258,237 B1 * | 2/2016 | Smith ................. H04L 12/4633 |

(Continued)

FOREIGN PATENT DOCUMENTS

| CN | 101365230 A | 2/2009 |
| CN | 101461196 A | 6/2009 |

(Continued)

OTHER PUBLICATIONS

Oct. 14, 2019 Office Action issued in Chinese Patent Application No. 201480077130.3 with partial translation.
(Continued)

*Primary Examiner* — Nicholas R Taylor
*Assistant Examiner* — Chong G Kim
(74) *Attorney, Agent, or Firm* — Squire Patton Boggs (US) LLP

(57) ABSTRACT

An apparatus and method which obtain an indication related to a de-instantiation of at least one virtualized network function providing services to a communication network. The obtained indication is used for determining or recognizing the virtualized network function being de-instantiated and for avoiding conducting a communication attempt to the virtualized network function to be de-instantiated.

11 Claims, 11 Drawing Sheets

(51) Int. Cl.
| | |
|---|---|
| *G06F 9/4401* | (2018.01) |
| *G06F 9/48* | (2006.01) |
| *G06F 9/50* | (2006.01) |
| *G06F 9/54* | (2006.01) |
| *H04W 24/02* | (2009.01) |
| *G06F 9/455* | (2018.01) |

(52) U.S. Cl.
CPC ............ *G06F 9/485* (2013.01); *G06F 9/5072* (2013.01); *G06F 9/542* (2013.01); *G06F 16/951* (2019.01); *H04L 41/12* (2013.01); *H04W 24/02* (2013.01); *G06F 2009/45575* (2013.01); *G06F 2009/45595* (2013.01)

(58) Field of Classification Search
CPC ................ G06F 9/5072; G06F 9/542; G06F 2009/45575; G06F 2009/45595; H04W 24/02
USPC ........................................................ 709/223
See application file for complete search history.

(56) References Cited

U.S. PATENT DOCUMENTS

| | | | |
|---|---|---|---|
| 9,578,664 | B1 | 2/2017 | Paczkowski et al. |
| 2011/0058521 | A1 | 3/2011 | Xu et al. |
| 2011/0099412 | A1 | 4/2011 | Chan et al. |
| 2012/0016979 | A1 | 1/2012 | Bortnikov et al. |
| 2012/0076120 | A1 | 3/2012 | Kovvali et al. |
| 2013/0054813 | A1 | 2/2013 | Bercovici et al. |
| 2013/0182558 | A1 | 7/2013 | Orten et al. |
| 2013/0268646 | A1 | 10/2013 | Doron et al. |
| 2013/0343468 | A1* | 12/2013 | Ko ......................... H04H 20/42 375/240.25 |
| 2014/0086177 | A1* | 3/2014 | Adjakple .............. H04W 12/08 370/329 |
| 2014/0089500 | A1 | 3/2014 | Sankar et al. |
| 2014/0201374 | A1* | 7/2014 | Ashwood-Smith ..... H04L 49/70 709/226 |
| 2014/0269893 | A1* | 9/2014 | Parikh ................. H04L 29/0651 375/240 |
| 2014/0362775 | A1* | 12/2014 | Steiner ................ G06F 9/45558 370/329 |
| 2015/0109995 | A1 | 4/2015 | Mathai et al. |
| 2016/0006836 | A1 | 1/2016 | LeFaucheur et al. |
| 2017/0024259 | A1* | 1/2017 | Mecklin ................ G06F 9/5044 |
| 2019/0289503 | A1* | 9/2019 | Wu .................. H04W 36/0005 |

FOREIGN PATENT DOCUMENTS

| | | |
|---|---|---|
| CN | 103477689 A | 12/2013 |
| EP | 2 086 252 A1 | 8/2009 |
| WO | 2007/139542 A1 | 12/2007 |
| WO | WO 2007/139542 A1 | 12/2007 |
| WO | WO 2015/000516 A1 | 1/2015 |

OTHER PUBLICATIONS

U.S. Office Action U.S. Appl. No. 15/907,499 dated Sep. 7, 2018.
"Man shutdown (8)," Sep. 4, 2012, SP055143282, retrieved from Internet: http://www.manpagez.com/man/8/shutdown/, 2 pages.
Korean Office Action issued in corresponding Korean Patent Application No. 10-2016-7022342 dated Aug. 24, 2017.
Korean Notice of Allowance issued in corresponding Korean Patent Application No. 10-2016-7022342 dated May 11, 2018.
International Search Report and Written Opinion dated Dec. 19, 2014 corresponding to International Patent Application No. PCT/EP2014/050910.
"Man shutdown (8)," Sep. 4, 2012, XP055143282, retrieved from Internet: http://www.manpagez.com/man/8/shutdown/.
SSL_shutdown—shut down a TLS/SSL connection; "SSL_shutdown (3)," Nov. 14, 2004, XP055143285, retrieved from Internet: http://unixhelp.ed.ac.uk/CGI/man-cgi?SSL_shutdown+3.
3GPP TS 23.401 V12.3.0 (Dec. 2013), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 12), Dec. 2013, 302 pages.
3GPP TS 29.274 V12.2.0 (Sep. 2013), Technical Specification, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C) Stage 3 (Release 12), Sep. 2013, 230 pages.
Apr. 18, 2018 Office Action issued in U.S. Appl. No. 15/112,039.
Nov. 20, 2018 Office Action issued in Chinese Patent Application No. 201480077130.3.
Korean Office Action application No. (PCT) 10-2018-7033144 dated Apr. 3, 2019.
Feb. 5, 2019 Office Action issued in U.S. Appl. No. 15/112,039.

* cited by examiner

| Octets | Bits 8 | 7 | 6 | 5 | 4 | 3 | 2 | 1 |
|---|---|---|---|---|---|---|---|---|
| 1 | Type = 117 (decimal) | | | | | | | |
| 2 to 3 | Length = n | | | | | | | |
| 4 | Spare | | | | Instance | | | |
| 5 | MCC digit 2 | | | | MCC digit 1 | | | |
| 6 | MNC digit 3 | | | | MCC digit 3 | | | |
| 7 | MNC digit 2 | | | | MNC digit 1 | | | |
| 8 to 9 | MME Group ID | | | | | | | |
| 10 | MME Code | | | | | | | |
| 11 to (n+4) | M-TMSI | | | | | | | |

Fig. 3

CONTROLLING OF COMMUNICATION NETWORK COMPRISING VIRTUALIZED NETWORK FUNCTIONS

CROSS REFERENCE TO RELATED APPLICATION

This application is a Divisional Application of U.S. patent application Ser. No. 15/112,039 filed on Jul. 15, 2016 which is a 371 application of International Patent Application No. PCT/EP2014/050910, filed Jan. 17, 2014. The contents of these applications are hereby incorporated by reference.

FIELD

The present invention relates to apparatuses, methods, systems, computer programs, computer program products and computer-readable media usable for controlling a communication network comprising at least one virtualized network function.

DESCRIPTION OF THE RELATED ART

The following description of background art may include insights, discoveries, understandings or disclosures, or associations, together with disclosures not known to the relevant art prior, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partner Project
ATCA: advanced telecommunications computing architecture
BGCF: breakout gateway control function
BS: base station
CAM cloud application manager (formerly known as CFW)
CFW cloud framework
CP control plane
DP data plane
CPU: central processing unit
DL: downlink
eNB: evolved node B
EPC: evolved packet core
ETSI European Telecommunications Standards Institute
GGSN: gateway GPRS support node
GO: global orchestrator
GPRS General Packet Radio Service
GTP-C GPRS tunnelling protocol-control plane
GUMMEI: globally unique MME identifier
GUTI: globally unique temporary identifier
HSS: home subscriber server
IBCF: interconnection border control function
ID: identification, identifier
IMS: IP multimedia system
IP Internet protocol
LTE: Long Term Evolution
LTE-A: LTE Advanced
MCC: mobile country code
MGCF: media gateway control function
MME mobility management entity
MNC: mobile network code
M-TMSI: MME temporary mobile subscriber identity
NE network element
NFV: network function virtualization
NUC: network utilisation controller
OAM operation administration maintenance
OFC: open flow controller
P-CSCF: proxy call session control function
PGW packet data network gateway
PGW-C PGW control plane
PGW-U PGW user plane
PIP/InP physical infrastructure provider/infrastructure provider
RAN: radio access network
SCTP: stream control transmission protocol
SDN software defined networks/networking
SGSN: serving GPRS support node
SGW signaling gateway
SGW-C SGW control plane
SGW-U SGW user plane
SIP: session initiation protocoll
UE: user equipment
UL: uplink
UMTS: universal mobile telecommunication system
UP user plane Embodiments of the present invention are related to a communication network comprising at least one virtualized network function. A virtualized network function may be of any type, such as a virtual core network function, a virtual access network function, a virtual IMS element, or the like.

SUMMARY

According to an example of an embodiment, there is provided, for example, a method comprising determining that at least one virtualized network function providing services related to a communication network is to be de-instantiated, preparing an indication related to the de-instantiation of the at least one virtualized network function, and causing transmission of the prepared indication to at least one of a network element of the communication network, a network function of the communication network and a database to which network elements or network functions of the communication network have access.

Furthermore, according to an example of an embodiment, there is provided, for example, an apparatus comprising at least one processor, and at least one memory for storing instructions to be executed by the processor, wherein the at least one memory and the instructions are configured to, with the at least one processor, cause the apparatus at least: to determine that at least one virtualized network function providing services related to a communication network is to be de-instantiated, to prepare an indication related to the de-instantiation of the at least one virtualized network function, and to cause transmission of the prepared indication to at least one of a network element of the communication network, a network function of the communication network and a database to which network elements or network functions of the communication network have access.

According to a further example of an embodiment, there is provided, for example, a method comprising obtaining an indication related to a de-instantiation of at least one virtualized network function providing services related to a communication network, and processing the obtained indication for determining or recognizing the virtualized network function being de-instantiated and for avoiding to conduct a communication attempt to the virtualized network function to be de-instantiated.

Furthermore, according to an example of an embodiment, there is provided, for example, an apparatus comprising at least one processor, and at least one memory for storing instructions to be executed by the processor, wherein the at least one memory and the instructions are configured to, with the at least one processor, cause the apparatus at least: to obtain an indication related to a de-instantiation of at least one virtualized network function providing services related to a communication network, and to process the obtained indication for determining or recognizing the virtualized network function being de-instantiated and for avoiding to conduct a communication attempt to the virtualized network function to be de-instantiated.

According to a further example of an embodiment, there is provided, for example, a method comprising receiving and processing an attach request from a communication element of a communication network for attaching to a virtualized network function providing services related to the communication network, preparing a response to the attach request, and causing transmission of the response to the requesting communication element, wherein the preparing of the response comprises including first identification data identifying the virtualized network function and second identification data identifying an intermediate network element or network function being related to the virtualized network function and to which messages related to the virtualized network function are to be directed.

Furthermore, according to an example of an embodiment, there is provided, for example, an apparatus comprising at least one processor, and at least one memory for storing instructions to be executed by the processor, wherein the at least one memory and the instructions are configured to, with the at least one processor, cause the apparatus at least: to receive and process an attach request from a communication element of a communication network for attaching to a virtualized network function providing services related to the communication network, to prepare a response to the attach request, and to cause transmission of the response to the requesting communication element, wherein the preparing of the response comprises including first identification data identifying the virtualized network function and second identification data identifying an intermediate network element or network function being related to the virtualized network function and to which messages related to the virtualized network function are to be directed.

According to a further example of an embodiment, there is provided, for example, a method comprising receiving and processing a message directed to a virtualized network function providing services related to a communication network, checking whether the virtualized network function is indicated to be still instantiated or not, and in case the result of the check is that the virtualized network function is de-instantiated, conducting a simulation process for replying to the received message on behalf of the de-instantiated virtualized network function.

Furthermore, according to an example of an embodiment, there is provided, for example, an apparatus comprising at least one processor, and at least one memory for storing instructions to be executed by the processor, wherein the at least one memory and the instructions are configured to, with the at least one processor, cause the apparatus at least: to receive and process a message directed to a virtualized network function providing services related to a communication network, to check whether the virtualized network function is indicated to be still instantiated or not, and in case the result of the check is that the virtualized network function is de-instantiated, conduct a simulation process for replying to the received message on behalf of the de-instantiated virtualized network function.

In addition, according to embodiments, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which:

FIG. 3 shows a diagram illustrating a structure of identification data usable in some examples of embodiments;

DETAILED DESCRIPTION

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user device or user equipment (UE) and another communication network element or user device, a database, a server, host etc., one or more network elements such as communication network control elements, for example access network elements like access points, base stations, eNBs etc. and core network elements or functions, for example control nodes, support nodes, service nodes, gateways etc. are involved, which may belong to different communication network systems.

Such communication networks comprise, for example, a large variety of proprietary hardware appliances. To launch a new network service often requires yet another variety and finding the space and power to accommodate these boxes is becoming increasingly difficult. Moreover, hardware-based appliances rapidly reach end of life. Due to this, it has been considered to use, instead of hardware based network elements, virtually generated network functions, which is also referred to as network functions virtualization. By means of software based virtualization technology, it is possible to consolidate many network equipment types onto industry standard high volume servers, switches and storage, which could be located in data centres, network nodes and in the end user premises, for example.

Figure 1:
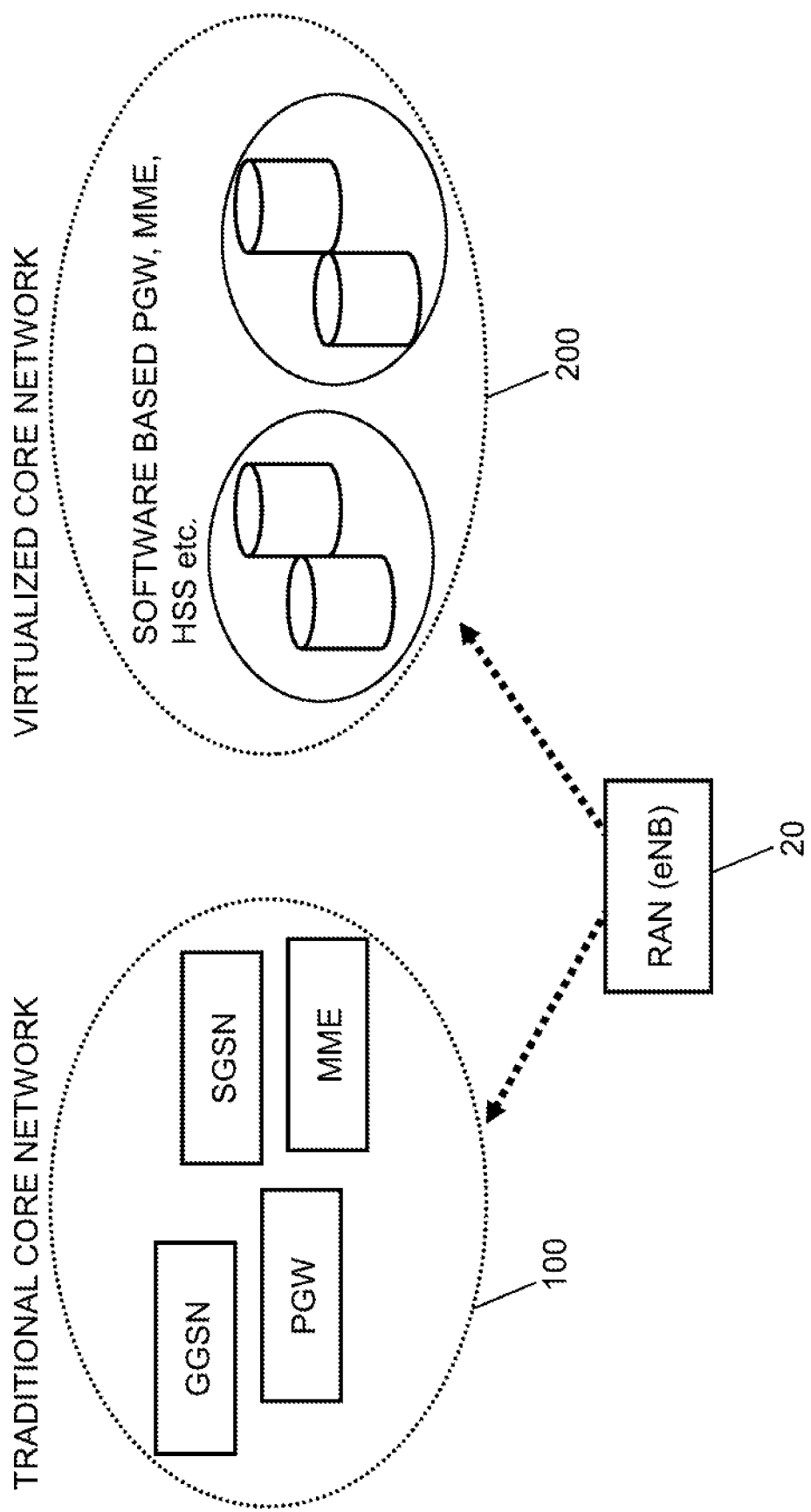
FIG. 1 shows a diagram illustrating a general configuration of communication networks where some examples of embodiments are implementable.

FIG. 1 shows an example of a general configuration of communication networks where some examples of embodiments are implementable. As shown in FIG. 1, network functions may be implemented as "traditional" network elements, i.e. as dedicated hardware entities forming e.g. a traditional core network 100 of a communication network system consisting of e.g. GGSN, SGSN, PGW, MME, SGW, SGW-U, SGW-C, PGW-U, PGW-C etc. Alternatively or additionally to the traditional core network, corresponding network functions may also be implemented in the form of virtual network functions (corresponding to network elements), i.e. as software running on corresponding computing devices like servers or the like and forming a virtualized core network 200. Such a virtualized core network comprises, for example, software based PGW, MME, HSS etc., which execute the same or at least similar functions like corresponding hardware based network elements. An access network subsystem 20, such as a RAN (comprising one or more BS or eNBs), may be controlled by and have access to the core networks 100 and 200, as shown in FIG. 1.

It is to be noted that in a communication system both approaches may be used simultaneously and in a mixed manner, i.e. a core network being employed for services comprises virtual and "real" network elements or functions interacting which each other. Furthermore, also other network functions besides those of a core network, such as network functions of an access network element like an eNB or BS may be provided as virtualized network functions.

NFV involves the implementation of network functions in software that can run on server hardware, and that can be moved to, or instantiated in, various locations in the network or cloud/datacenters as required, without the need for installation of new equipment. It is to be noted that NFV is able to support SDN by providing the infrastructure upon which the SDN software can be run. Furthermore, NFV aligns closely with the SDN objectives to use commodity servers and switches.

Within SDN, it is possible to split control plane and user plane. Furthermore NFV may be implemented in such a manner that network functions are instantiated and located within a so-called cloud environment, i.e. a storage and processing area shared by plural users, for example. For supporting the NFV using a cloud, a so-called cloud application manager (CAM) or the like (Cloud Framework, CFW) may be used. By means of this, it is for example possible to dynamically placing elements/functions of a core network in a flexible manner (e.g. without or with decomposed SGW and/or PGW being split into SGW-C, PGW-C, SGW-U, PGW-U and OFC) into the cloud.

Dynamically placing the NF into the cloud allows also that all of the NFs or some parts or functions of the core network are dynamically withdrawn completely from the cloud (i.e. de-instantiated), while other parts (legacy or SDN based or virtualized network functions) remain in the network structure.

De-instantiated (or de-instantiation) means, for example, that a virtual network function acting in a communication network in the virtualized network part (see e.g. FIG. 1) is turned off, deactivated or made in some other manner not available for other communication network elements or functions, i.e. the instantiation of the virtual network function in question is removed or cancelled, at least temporarily.

Examples of embodiments of the invention are related to a case where a virtualized network function, such as a virtualized core network function (such as MME, SGW, PGW, HSS etc.) or a virtualized access network function (such as an eNB), a virtualized IMS function (such as a P-CSCF, IBCF, BGCF, MGCF etc.) is de-instantiated or shall be de-instantiated, i.e. at least partly cancelled or deactivated from the point of view of other network elements. For example, examples of embodiments of the invention are related to scenario where an UE attaches or registers to an eNB which was connected to a (newly) instantiated virtualized MME or the like, and where this virtualized MME is de-instantiated at a later point of time.

It is to be noted that in the following the term "attach" or "register" is to be understood as representing different forms of connecting or establishing and maintaining a connection between a communication element like a UE and a network (i.e. one or more network elements or functions), such as "attach" in the sense of LTE systems, "register" in the sense of IMS systems, etc. Similarly, the term "detach" or "deregister" is to be understood as representing different forms of disconnecting or cancelling a connection between a communication element like a UE and a network (i.e. one or more network elements or functions), such as "detach" in the sense of LTE systems, "deregister" in the sense of IMS systems, etc.

In the following, some examples of embodiments are described with reference to the drawings, wherein, as an example of a communication network, a cellular wireless communication network, such as an LTE or LTE-Advanced based system, is used. However, it is to be noted that the present invention is not limited to an application using such types of communication systems, but is also applicable in other types of communication systems, be it wireless systems, wired systems or systems using a combination thereof.

The following examples versions and embodiments are to be understood only as illustrative examples. Although the specification may refer to "an", "one", or "some" example(s) or embodiment(s) in several locations, this does not necessarily mean that each such reference is to the same example(s) or embodiment(s), or that the feature only applies to a single example version or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where examples of embodiments are applicable may comprise a commonly known architecture of one or more communication networks comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a UE and a communication network besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage. As indicated above, network elements, such as access network elements or core network elements, may also be implemented by using a corresponding virtualized network function.

Furthermore, the described network elements, such as terminal devices or user devices like UEs, communication network control elements of a cell, like a BS or an eNB, access network elements like APs and the like, core network elements etc. as well as corresponding functions as described herein may be implemented by software, e.g. by a computer program product for a computer, and/or by hardware. For executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network control element or of another entity of the communication network, such as of one or more of RAN elements like a BS or eNB, may be performed in different entities or functions, such as in a node, host or server, in a flexible manner. In other words, a "division of labour" between involved network elements, functions or entities may vary case by case.

Figure 2:
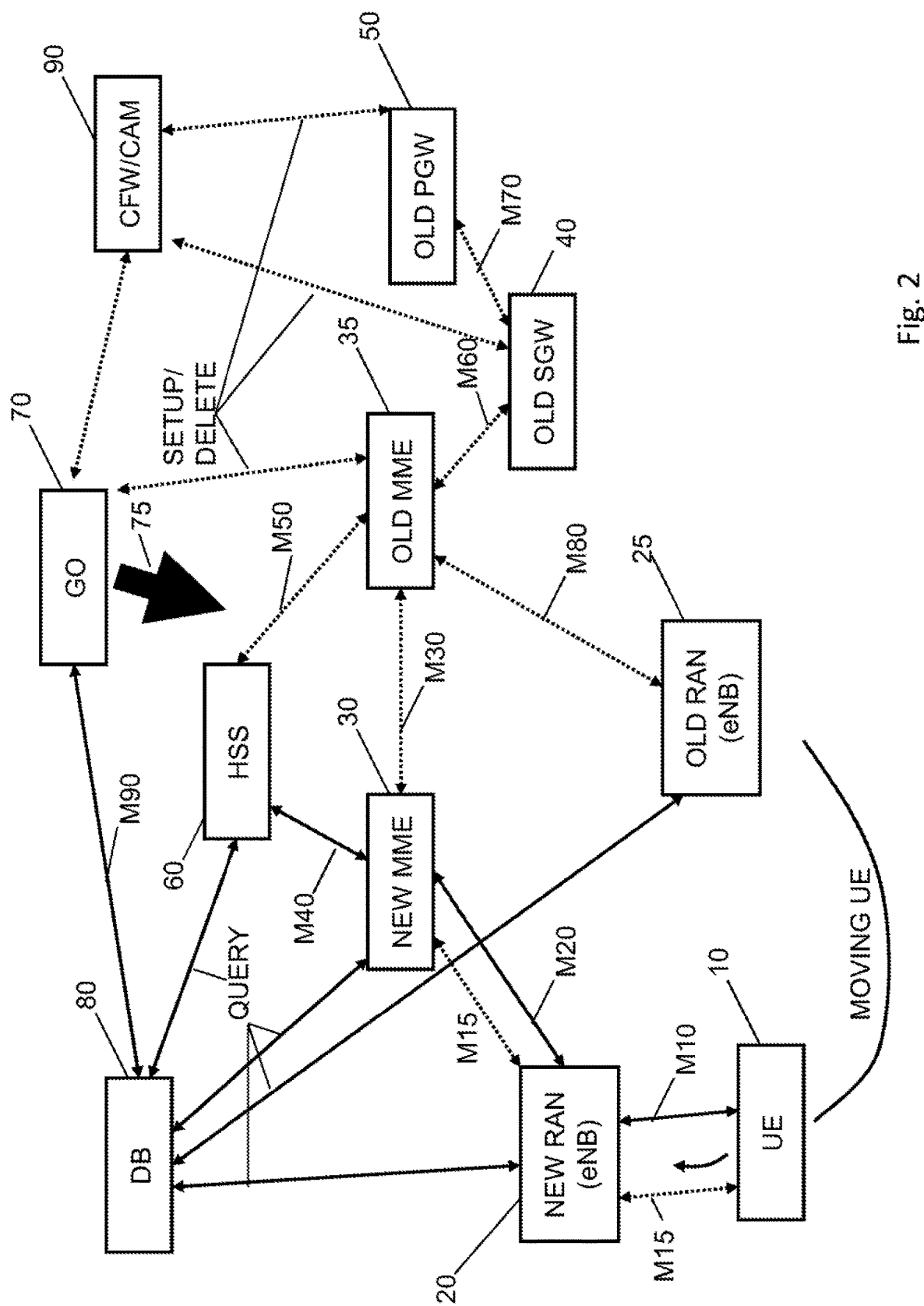
FIG. 2 shows a diagram illustrating a configuration of a communication network where some examples of embodiments are implementable.

FIG. 2 shows a diagram illustrating a configuration of a communication network where some examples of embodiments are implementable. It is to be noted that the configuration shown in FIG. 2 shows only those devices, network elements and/or parts which are useful for understanding principles underlying the example versions and embodiments. As also known by those skilled in the art, there may be several other network elements, functions or devices involved in a communication network which are omitted here for the sake of simplicity.

In FIG. 2, a communication network configuration is illustrated which is for example based on the 3GPP specifications. It is to be noted that the general functions of the elements described in connection with FIG. 2 as well as of reference points/interfaces between the elements are known to those skilled in the art so that a detailed description thereof is omitted here for the sake of simplicity.

As shown in FIG. 2, in the exemplary communication network system, a communication element such as a UE 10 is located in a communication area which is controlled by a respective communication network control element of an (radio) access network (RAN) comprising e.g. a base station or eNB 20 or 25. It is to be noted that the UE may change its location within the network from one communication area or cell to another. In the illustrated example, the eNB 20 will be referred to as a new RAN element or eNB indicating that it is the RAN to which the UE 10 has changed or switched, while the eNB 25 will be referred to as an old RAN element or eNB indicating that it is the RAN from which the UE 10 has changed or switched (indicated also by the arrow at the UE 10).

The respective RAN elements 20 and 25 are connected with core network elements of the EPC. The core network elements comprises, for example, MMEs 30 and 35, wherein MME 30 is assumed to be connected to the new eNB 20 and thus referred to as new MME 30, while MME 35 is assumed to be connected to the old eNB 25 and thus referred to as the old MME 35. The MMEs 30 and 35 are connected with HSS 60. Furthermore, the MMEs are also connected to a SGW which in turn is connected to a PGW. In the example illustrated in FIG. 2, only SGW 40 and PGW 50 are illustrated which are related to the old MME 35.

It is to be noted that the above described architecture indicated in FIG. 2 may be one being based on e.g. the 3GPP specification TS 23.401 (see e.g. version 12.3.0), to which reference is made herewith.

Moreover, it is to be noted that according to examples of embodiments of the invention, at least one of the network elements (i.e. core network elements or access network elements) is at least partly implemented by using a virtualized network function. In the following, it is assumed that the old MME 35 is such a virtualized network function. However, also other network elements can be implemented as virtualized network functions in addition or alternatively to the MME 35.

Further elements shown in FIG. 2 are a global orchestrator element or function (GO or NUC) 70, a database 80 and a CAM (CFW) 90.

The GO 70 is used to (directly or indirectly via the CAM 90) manage the virtualization of network functions, i.e. to instantiate (setup) and de-instantiate (delete) the respective NFs e.g. in a cloud environment and to generate and manage the links to other network elements and functions of the communication network. For example, an SDN controller (not shown) may be implemented in the NFV. According to examples of embodiment, some sort of interface from the GO 70 to the cloud/datacenter is provided (even a dedicated ATCA platform), which may be designed to dynamically host software related to the virtualized network function, such as a MME software, a SGW software etc, which can be instantiated or withdrawn, or the like. It is to be noted that also the ATCA platform may be dynamically be loaded with the software needed for acting as e.g. the SGW-U (or otherwise enabled).

It is to be noted that according to examples of embodiments the GO 70 is able to instantiate/de-instantiate any virtualized network function via the CFW/CAM 90. Furthermore, there are also links between the respective network elements or function (wherever they may be located, i.e. in a physical entity or in a cloud/datacenter) which are not completely indicated in FIG. 2.

Furthermore, it is to be noted that according to examples of embodiments the type of network function which can be instantiated by the GO 70 (via the CFW/CAM 90 or directly) is not limited to one type only. For example, besides a MME, network function which can be also instantiated are any SGW or PGW and/or decomposed SGW-C and SGW-U or PGW-C and PGW-U. The type of the network function to be instantiated by the GO 70 may be selected and instructed by an operator according to a current need or the like.

According to some examples of embodiments, the GO 70 is also able to provide information regarding the virtualized NF to other network elements and functions (which will be described later). This is indicated by arrow 75 which represents an indication for a corresponding communication or signaling to the network elements or functions being involved (for example, a signaling to the MME 30 is concerned, in accordance with the following description, but also other network elements or functions may be recipients of a corresponding signaling caused by the GO 70). The goal of this signaling is, for example, to inform the respective network element or function about the de-instantiation of a virtualized network function so as to suppress the sending of message (such as an identification request message) towards the de-instantiated network function (e.g. the old MME 35) as will be described below.

The database 80 is used, for example, by the GO 70 as storage for status information related to the virtualized network functions. For example, the database 80 is used to store and maintain information indicating a status of all currently and formerly instantiated NFs, which information is updated by the GO 70 (see e.g. signaling at M90). The status information can be accessed by network elements by means of a query, for example (see also arrows from the RAN elements and core network elements in FIG. 2). It is to be noted that the database 80 may consist of one or more centralized databases within the communication network, or by local databases located at respective network elements and entities, or a combination thereof. In case of (plural) local databases included in respective network elements, the status information related to the virtualized network function can be written and updated by means of a suitable signaling, e.g. in association with the signaling indicated with arrow 75.

In the following, as an initial starting point, it is assumed that the UE 10 is connected to the eNB 25 and registered/attached to the communication network via the MME 35, the SGW 40 and the PGW 50 by using a network attachment procedure as described, for example, in corresponding specifications (see e.g. 3GPP TS23.401 v12.3.0).

Now, it is assumed that the UE 10 is turned off or the like and moved to another communication area, e.g. to that of eNB 20. Here, it is not connected to the old MME 35. Instead, the UE 10 has to register with a new MME, i.e. the new MME 30. In this procedure, at M10, the UE 10 sends an attach request to the new eNB 20. The attach request comprises, for example, an identification element or identification data which allows the receiving network elements (here the eNB 20 and also the MME 30) to detect that the requesting communication element was already attached or connected to the network. For example, the identification element or data comprises an identification of network elements or functions, such as of an MME (here the old MME 35) which can be used by the eNB 20 for conducting the network attach procedure. As one example, a corresponding identification is comprised in a GUTI being provided in the "old" attachment to the MME 35. It is to be noted that the new MME 30 will be able to know, for example, due to the content of a GUTI the old MME. Furthermore, the eNB may select the new MME based on an indication in the GUTI, e.g. the old GUMMEI.

FIG. 3 shows a diagram illustrating a structure of a GUTI being usable as an example of identification data usable in some examples of embodiments.

Basically, the purpose of the GUTI is to provide an unambiguous identification of the UE that does not reveal the UE or the users permanent identity in the communication network. It also allows the identification of the MME and network, and is used by the network and the UE to establish the UE's identity during signaling between them in the communication network. The GUTI has two main components. One is the GUMMEI being constructed from MCC, MNC and an MME identifier comprising an MME group ID and an MME code, which uniquely identifies the MME which allocated the GUTI. The other one is the M-TMSI that uniquely identifies the UE within the MME that allocated the GUTI.

Back to FIG. 2, after receiving the attach request, the new eNB 20 derives the MME from identification information, e.g. the GUMMEI. Assuming that MME is not associated with the eNB 20, a new MME is selected, e.g. the new MME 30, and the attach request is forwarded in M20 to the new MME 30.

The new MME 30 may determine the old MME 35 by using the GUTI received from the UE 10 to derive the old MME address, and send an identification request to the old MME in M30. The old MME 35 responds with an identification response (see M30).

The new MME 30 may send an attach accept message to the new eNB 20 (M20), wherein again identification data such as a "new" GUTI is included if the new MME 30 allocates a new GUTI. Furthermore, a location update procedure with the HSS 60 is conducted (see M40).

In the meantime, the old MME 35 may conduct a cancel location procedure (M50) with HSS 60, and a session delete procedure with the old SGW 40 and old PGW 50 (see M60 and M70).

It is to be noted that the above described attach procedure is only a simplified example. A more detailed procedure may be based, for example, on that described in 3GPP TS23.401 v12.3.0.

As indicated above, according to some examples of embodiments, at least one of the network elements shown in FIG. 2 is assumed to be a virtualized network function, for example the old MME 35.

Assuming now a situation where the virtualized old MME 35 had been de-instantiated (e.g. because it was not needed anymore) in the meantime, i.e. before the UE 10 starts the attach procedure with the new RAN (eNB 20) after having been deactivated or the like. In this case, the new MME 30 would not succeed with its communication attempt towards the old MME 35. That is, the signaling related to M30 is not responded. In this case, a delay in the set-up procedure for the UE 10 with the new eNB 20 occurs, e.g. due to repeated communication attempts by the new MME 30, which would inhibit to decrease an overall delay in user experience when implementing virtualized network functions. For example, it may be required that any entity sending e.g. a GTP-C signaling message is mandated to reliable transfer the message. That especially means that the sender has to repeat sending until it is was successfully acknowledged or the entity detects the final failure after several retries. Anyhow, this leads to a delay of the set-up.

According to some examples of embodiments of the invention, this situation is overcome by the following measures. That is, according to the present examples of embodiments, when it is determined that a virtualized network function providing services related to a communication network (such as the MME 35) is de-instantiated or will be de-instantiated, a specific indication informing about the de-instantiation of the virtualized network function is prepared and sent to network entities, elements or functions or databases which can use this information so as to avoid unsuccessful communication attempts as that described above with regard to the signaling in M30.

It is to be noted that the determination of the de-instantiation of the virtualized network function is achievable by different measures, according to examples of embodiments of the invention. Basically, any measure allowing the respective control network element or function (such as the GO 70) to know that a virtualized network element or function is de-instantiated or will be de-instantiated is suitable for the determination of the de-instantiation of the virtualized network function. For example, the determination is achieved when the GO 70 (or another control entity) decides that the virtualized network function is not needed anymore and hence to be de-instantiated, wherein a corresponding de-instantiation procedure for the virtualized network function is then to be conducted, resulting in the determination that the virtualized network function is de-instantiated. Alternatively, the de-instantiation of the virtualized network function is initiated by other means (a datacenter operator, due to a failure, etc.), and a corresponding information is obtained by the GO 70 or the like, wherein then the determination that the virtualized network function is de-instantiated is achieved by recognizing the corresponding information. As a further alternative, the GO 70 (or another control entity) conducts a measurement or the like in order to detect whether the virtualized network element is still existing, wherein in case the measurement is negative, this is used as determination that the virtualized network function is de-instantiated.

According to some examples of embodiments, as the indication, a detach procedure, which is initiated by a corresponding network element or function, is conducted. One of possible network elements or functions capable of initiating such a detach procedure is, for example, the HSS 60, which starts a HSS-initiated detach procedure.

By means of the detach procedure, subscription data in at least one network element or function can be removed, for example subscription data in the HSS 60, the MME 35, the UE 10 are removed. The indication or command to conduct the detach procedure is for example accompanied by a cause code or the like, such as a cause "subscription withdrawn", which is caused to be transmitted before the virtualized MME 35 is de-instantiated. The detach procedure may be instructed, for example, by the GO 70 via a cloud application manager (CAM/CFW 90) and/or an OAM centre (not shown).

One example of subscription data is the GUTI (see e.g. FIG. 3). The GUTI contains the ID of the last/old MME (MME Code and MME group ID). By means of the detach procedure (e.g. the HSS-initiated detach procedure) with "subscription withdrawn", the old GUTI is deleted at the UE 10.

According to some further examples of embodiments, the detach procedure is executed in a combined manner. That is, a command is provided which allows to execute a bulk detach procedure (e.g. a bulk "HSS-initiated detach" command) for the whole virtualized network function to be de-instantiated (e.g. for the MME 35). That is, it is not necessary to individually detach each and every UE from the network. Instead, by using such a new bulk command, all UE currently registered with the virtualized MME which is to be de-instantiated are detached at once. For example, in case of bulk instruction, an ID of the element being de-instantiated (e.g. the old MME 35) is provided. Network elements or functions receiving an instruction related to the bulk detach procedure then searches its subscription data (e.g. in a corresponding subscription database) for network elements (UEs and/or other network elements) being associated with the function to be de-instantiated on the basis of this ID. For the positive results of the search, the detach procedure is conducted.

Alternatively or additionally to the above described detach procedure, according to some further examples of embodiments, the indication provided allows to suppress a communication attempt to the de-instantiated virtualized network function directly in the new network element (e.g. in the new MME 30). That is, for example, the query (identification request in M30) to the old MME 35 is inhibited.

For example, a UE may decide on itself to detach from the virtualized MME 35 at any arbitrary time even before a detach procedure like that described above (e.g. a HSS-initiated detach procedure) was triggered. In that case, the identification data (such as the GUTI) is not deleted in the UE and not necessarily deleted immediately in the MME (and the HSS). Therefore, there are still cases were the UE 10 may register with a new MME 30 with its old identification data (the old GUTI allocated by the old virtualized MME 35). Still, since the old MME 35 is de-instantiated at this time, the new MME 30 is not able to contact the old (virtualized) MME 35.

Therefore according to the present examples of embodiments, an information is provided to any network element or function which may be interested in the information (e.g. all network elements or functions which may contact the de-instantiated network function, such as network elements or functions having the same task, like remaining MMEs (virtualized or physical) of the network, are informed that one or more virtualized network functions (such as the MME 35) had been de-instantiated in the meantime. The information is provided, for example, by the GO 70 e.g. via OAM interface.

Hence, when the new MME 30 receives an initial attach request (M20 in FIG. 2), before starting to send the identification request to any old MME (or SGSN) indicated e.g. in identification information or data received from the UE 10 (such as the GUTI), the new MME 30 checks (internally or externally) whether the indicated MME/SGSN is a virtualized MME/SGSN for which an information has been received that it exist or is de-instantiated. In case it was reported that the MME/SGSN in question is not to instantiate anymore, the new MME 30 skips the sending of the identification request towards the old MME/SGSN completely as it will not be successful at all.

Similarly, according to some examples of embodiments, other network entities are informed about the de-instantiation of the virtualized network functions (such as MME 35) for similar purposes. For example, any HSS (virtualized or not) is informed accordingly about the de-instantiation of the MME.

According to some further examples of embodiments, alternatively or additionally to the above described procedures, database 80 as shown in FIG. 2 is implemented for supporting the control process in case a virtualized network function is de-instantiated.

For example, the database 80 is maintained by the GO (or NUC) 70 in order to list a status of current and formerly instantiated NF. For instance, if a particular MME/SGSN or SGW-C or PGW-C (or SGW and PGW) is active it is marked as such in the database. In addition, in case the GO 70 decides or recognizes by other means that a virtualized network function does not longer exist, the GO 70 updates the corresponding entry in the database 80. It is to be noted that the database may be a centralized database (as indicated in FIG. 2) and/or may be implemented as a local database to several or all of the network elements of the communication network. Information to the database 80 from the GO 70 is transmitted e.g. by signalling M90 (in case of a centralized database) or by means of signalling related to signalling according to arrow 75 in FIG. 2 (in case of local databases).

Hence, in case any of the existing network elements or functions needs to contact a "potentially" virtualized network function (which, as described above, may no longer be instantiated), the network element sends a query to the central database 80 (or queries a local database) in order to learn whether the network function in question is still instantiated. That is, the indication regarding the state of the virtualized network function is obtained by means of the corresponding query to a central (i.e. external) or local (i.e. internal) database. Thus, as described above, it is possible to recognize that it is not needed to try to contact the corresponding NF, since it was already torn down (de-instantiated). That is, a network element or function, such as the new MME 30, queries the central or local database in order to learn/detect whether the old MME 35 is torn down or not, which allows to suppress unneeded retries and a corresponding delay. In case the information is obtained that the old MME 35 is de-instantiated, the new MME 35 may also start a default identification request procedure with the UE 10 as early as possible (e.g. by means of signalling M15).

According to further examples of embodiments, in case the MME 35 is de-instantiated, also the RAN (such as the eNB 25 via the S1-MME interface) is impacted. Therefore, in the virtualised environment, the eNB is informed about the de-instantiation as well.

For example, in case of the initialisation of a SCTP association, the eNB 25 retransmit repeatedly messages via the S1-MME (see e.g. signalling on M80) until the eNB 25 finally considers that the endpoint is unreachable. In this case, it enters a CLOSED state and may possibly report the failure to an upper layer. Thus, the eNB 25 may repeat to send messages to the MME 35 although the GO/NUC already knows about the possible/intended/factual termination of the MME 35. Therefore, the RAN (e.g. eNB 25) obtains the information of the de-instantiation of the MME 35 and can thus avoid an unsuccessful communication attempt and hence a waste of resources. For example, the eNB 25 may query the database 80, e.g. when a communication attempt to the MME 35 was not acknowledged or before any communication attempt towards the MME 35 is started.

While above described examples are related to a de-instantiation of an MME (i.e. MME 35) as a virtualized network function, as indicated beforehand, also other scenarios are possible. For example, according to further examples, in case it is determined that, as a virtualized network function, e.g. a network function like a PGW(-C/U) or SGW(-C/U) is de-instantiated (for example, the GO 70 decides or knows about the de-instantiation thereof), a network element or function which requires such an information, like an MME, is informed that the corresponding PGW(-C/U) or SGW(-C/U) functions are de-instantiated. The reason is that in case an PGW and SGW selection process is located in the network element or function in question (e.g. at the MME), the de-instantiated network function (i.e. the PGW(-C/U) or SGW(-C/U)) should not be considered in the selection process, as the corresponding instance ceased to exist.

It is to be noted that while the above described example of embodiments is related to a scenario implemented in an LTE system (i.e. eNB and EPC), examples of embodiments are also applicable to other communication systems and implementations. For example, examples of embodiments can be implemented in IMS or the like, for instance with regard to virtualized functions related to an P-CSCF, IBCF, BGCF, MGCF and on the like. In the IMS, it is to be noted that an UE performs a (SIP) registration procedure which is comparable to the LTE/EPC/eNB attachment procedure described above, so that the same principles as described with regard to the attachment procedure can be applied there as well.

Consequently, the same procedures as described above with regard to NFV in LTE systems may be used for other systems, such as for NFV in IMS, and the same principle can be applied.

Figure 4:
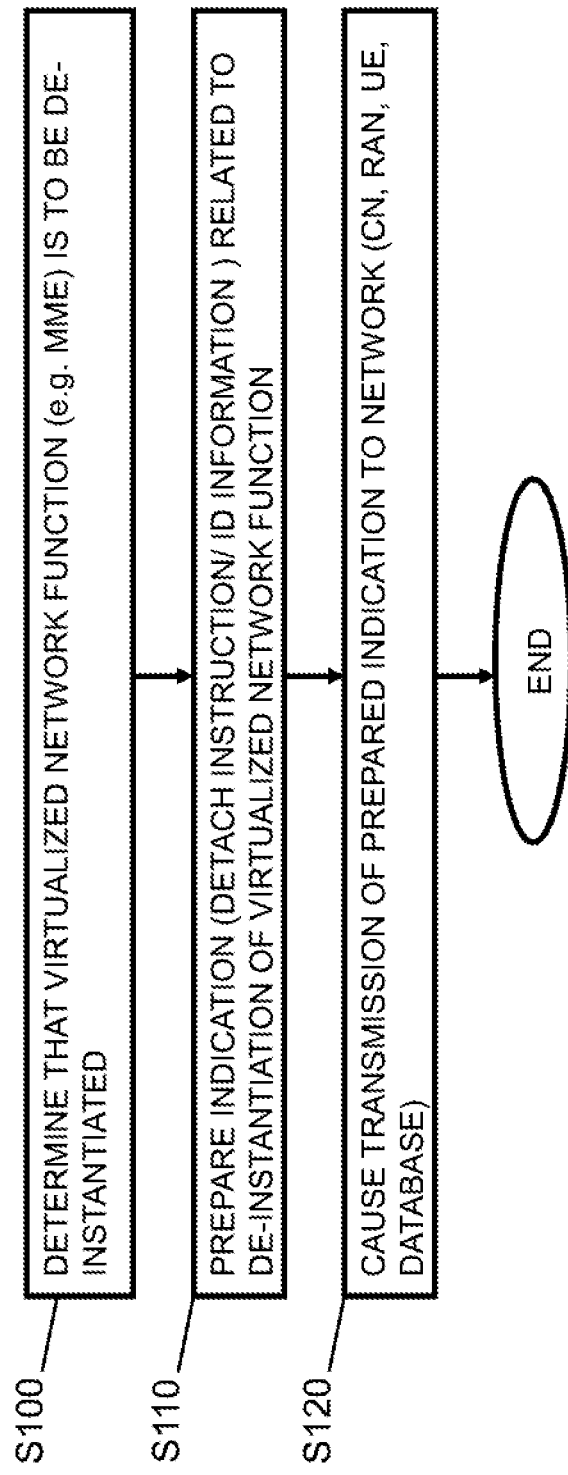
FIG. 4 shows a flow chart of a processing conducted in a communication network control element or function acting as an indication provider according to some examples of embodiments.

FIG. 4 shows a flow chart of a processing conducted in a communication network control element or function acting as an indication provider indicating the de-instantiation of a network function, according to some examples of embodiments. For example, the processing is executed by one of a communication network control element or communication network control function acting as a global orchestrator for implementing virtualized network functions, the virtualized network function to be de-instantiated, or an OAM element or function of a communication network. According to some examples of embodiments, the virtualized network function to be de-instantiated is related to a communication network control function of the communication network (e.g. core network function, access network function, IMS network function, etc.).

In S100, it is determined that at least one virtualized network function providing services related to the communication network is to be de-instantiated, i.e. to be deactivated or the like.

In S110, an indication related to the de-instantiation of the at least one virtualized network function is prepared.

For example, the indication related to the de-instantiation of the at least one virtualized network element comprises an instruction for conducting a detach procedure, such as a HSS initiated detach procedure. The detach procedure comprises, for example, to delete the stored subscription data related to the at least one virtualized network element to be de-instantiated. According to some examples of embodiments, the instruction for conducting the detach procedure comprises a specific cause indication for a withdrawal of a subscription with regard to the at least one virtualized network element to be de-instantiated. For example, subscription data containing an indication of the virtualized network function are to be deleted, such as an identification element assigned to a UE and including identification information of the virtualized network element to be de-instantiated (e.g. GUTI for a UE).

According to further examples, the instruction may be a bulk instruction allowing for conducting the detach procedure for all communication elements (i.e. UEs) being currently registered for the at least one virtualized network element to be de-instantiated.

Alternatively or additionally, the indication related to the de-instantiation of the at least one virtualized network element comprises an identification information indicating that the at least one virtualized network element to be de-instantiated is de-instantiated and not available anymore.

In S120, a transmission of the prepared indication to at least one of a network element of the communication network, a network function of the communication network and a database to which network elements or network functions of the communication network have access is caused.

For example, the transmission of the identification information is caused to at least one of a network element of the communication network and a network function of the communication network which potentially contacts the at least one virtualized network element to be de-instantiated. This allows, for example, that the de-instantiated virtualized network function is not contacted at all anymore.

According to some examples of embodiments, the prepared indication is caused to be sent to at least one of a communication element comprising a terminal device or UE capable of communicating in the communication network, a RAN network element or RAN network function, a network element or network function of a core network part of the communication network, and a database to which network elements or network functions of the communication network have access, wherein the database is comprised in at least one of a centralized database of the communication network and a local database comprised in one or more of the network elements or network functions of the communication network.

Figure 5:
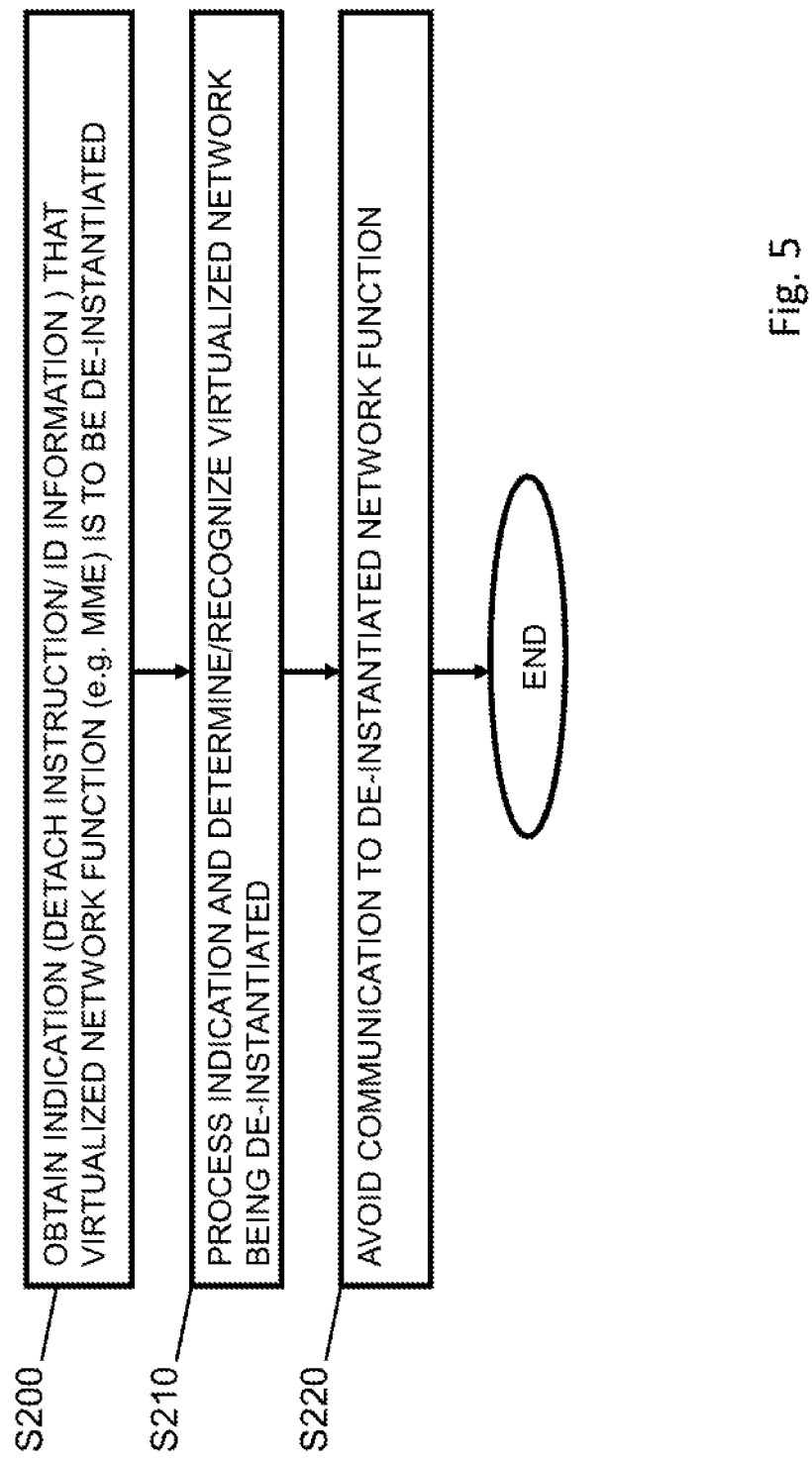
FIG. 5 shows a flow chart of a processing conducted in a communication network control element or function acting as an indication obtainer according to some examples of embodiments.

FIG. 5 shows a flow chart of a processing conducted in a communication network control element or function acting as an obtainer of an indication indicating the de-instantiation of a virtualized network function, according to some examples of embodiments. For example, the processing is executed by one of a communication element comprising a terminal device or UE capable of communicating in a communication network, a RAN network element or network function of the communication network, and a network element or network function of a core network part of the communication network. According to some examples of embodiments, the virtualized network function to be de-instantiated is related to a communication network control function of the communication network (e.g. core network function, access network function, IMS network function, etc.).

In S200, the indication related to the de-instantiation of at least one virtualized network function providing services related to the communication network is obtained, for example received by means of a suitable signaling. For example, the indication related to the de-instantiation of the at least one virtualized network function is obtained from one of a communication network control element or communication network control function acting as a global orchestrator for implementing virtualized network functions, the virtualized network function to be de-instantiated, and an OAM element of the communication network. As described above, also a query at a database (internal/local or external/centralized) may act as the source for obtaining the indication related to the de-instantiation.

In S210, the obtained indication is processed for determining or recognizing the virtualized network function being de-instantiated.

Then, in S220, a processing is conducted so as to avoid a communication attempt to the virtualized network function to be de-instantiated is avoided.

For example, when, as the indication related to the de-instantiation of the at least one virtualized network element, an instruction for conducting a detach procedure is obtained, wherein the detach procedure may include a deletion of stored subscription data related to the at least one virtualized network element to be de-instantiated, the detach procedure is executed accordingly. According to some examples of embodiments, the instruction for conducting the detach procedure comprises a specific cause indication for a withdrawal of a subscription with regard to the at least one virtualized network element to be de-instantiated. For example, subscription data containing an indication of the virtualized network function are deleted, such as an identification element assigned to a UE and including identification information of the virtualized network element to be de-instantiated (e.g. GUTI for a UE).

According to further examples, the instruction may be a bulk instruction allowing for conducting the detach procedure for all communication elements (i.e. UEs) being currently registered for the at least one virtualized network element to be de-instantiated.

Alternatively or additionally, the indication related to the de-instantiation of the at least one virtualized network element comprises an identification information indicating that the at least one virtualized network element to be de-instantiated is de-instantiated and not available anymore.

According to some examples of embodiments, the processing comprises to check, when a communication attempt is to be conducted to a network element or network function of the communication network, e.g. in connection with a registration or identification procedure, whether the network element or network function is indicated in the identification information indicating the at least one virtualized network element to be de-instantiated as being de-instantiated and not available anymore. In case the result of the check is affirmative, i.e. the network element is indicated to be de-instantiated, the communication attempt to the virtualized network function being de-instantiated is immediately skipped. Instead, for example, a default initial registration process or the like is executed.

Furthermore, according to some example versions of the disclosure, a database to which network elements or network functions of the communication network have access, may be queried. The database is comprised, for example, in at least one of a centralized database of the communication network and a local database comprised in one or more of the network elements or network functions of the communication network, wherein the indication related to a de-instantiation of at least one virtualized network function is obtained from the database.

Figure 6:
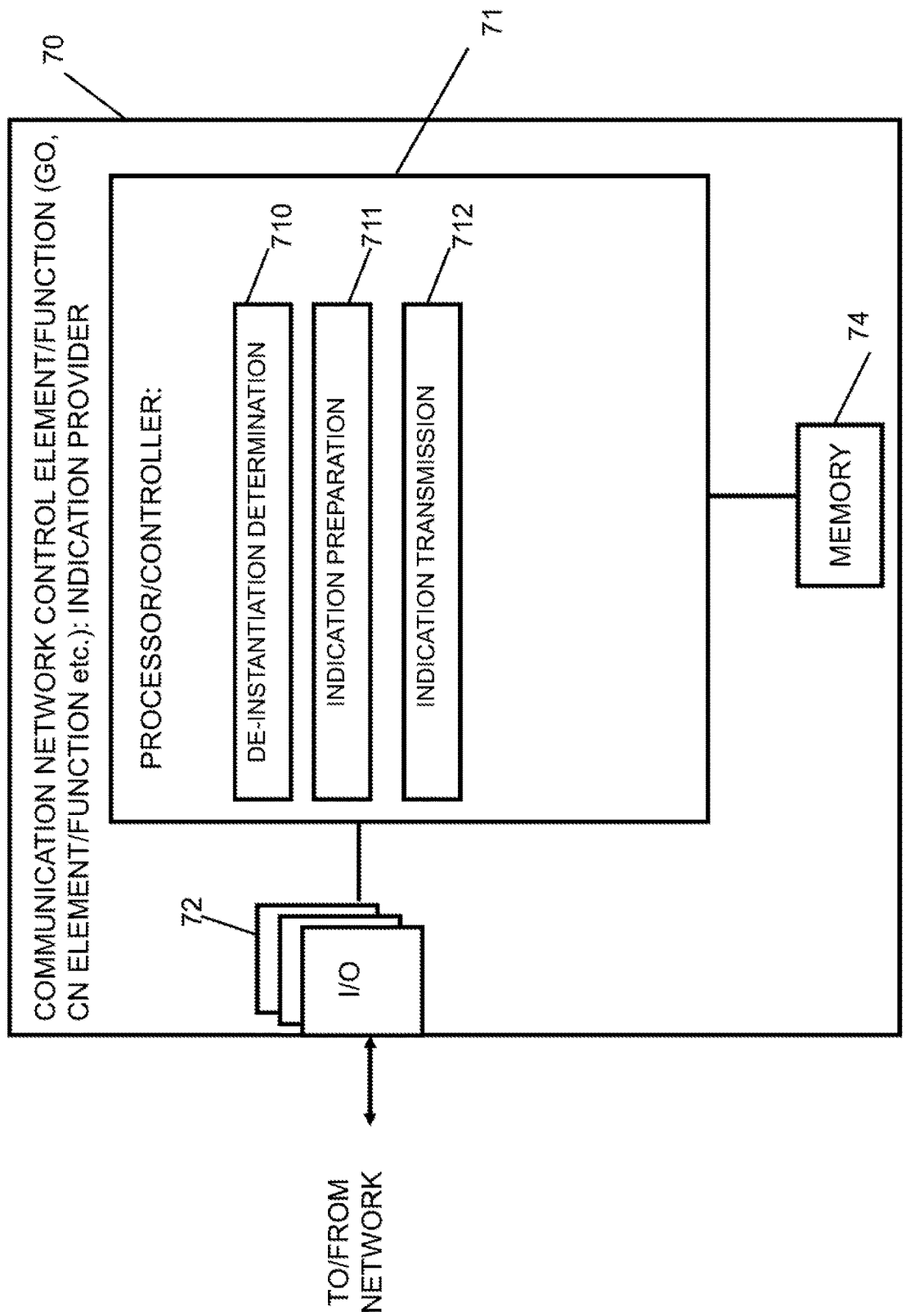
FIG. 6 shows a diagram of a communication network control element or function acting as an indication provider according to some examples of embodiments.

FIG. 6 shows a diagram of a communication network control element or function acting as an indication provider according to some examples of embodiments, which is configured to implement the control procedure as described in connection with some of the examples of embodiments. It is to be noted that the communication network control element or function, like the GO 70, a virtualized network function like the MME 35, etc., which is shown in FIG. 6, may comprise further elements or functions besides those described herein below. Furthermore, even though reference is made to a communication network control element or function, the element or function may be also another device or function having a similar task, such as a chipset, a chip, a module etc., a module etc., which can also be part of a communication network control element or function or attached as a separate element or function to a communication network control element or function, or the like. It should be understood that each block and any combination thereof may be implemented by various means or their combinations, such as hardware, software, firmware, one or more processors and/or circuitry.

The communication network control element or function shown in FIG. 6 may comprise a processing function, a control unit or a processor 71, such as a CPU or the like, which is suitable for executing instructions given by programs or the like related to the control procedure. The processor 71 may comprise one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 72 denotes transceiver or input/output (I/O) units or functions (interfaces) connected to the processor or processing function 71. The I/O units 72 may be used for communicating with one or more network elements, such as communication elements like UEs, RAN element, core network elements or functions, databases/datacenters and the like. The I/O units 72 may be a combined unit comprising communication equipment towards several network elements, or may comprise a distributed structure with a plurality of different interfaces for different network elements. Reference sign 74 denotes a memory usable, for example, for storing data and programs to be executed by the processor or processing function 71 and/or as a working storage of the processor or processing function 71.

The processor or processing function 71 is configured to execute processing related to the above described control procedure. In particular, the processor or processing function 71 comprises a sub-portion 710 as a processing portion which is usable for conducting a de-instantiation determination. The portion 710 may be configured to perform processing according to S100 of FIG. 4. Furthermore, the processor or processing function 71 comprises a sub-portion 711 usable as a portion for preparing an indication. The portion 711 may be configured to perform processing according to S110 of FIG. 4. Furthermore, the processor or processing function 71 comprises a sub-portion 712 usable as a portion for transmitting the prepared indication. The portion 712 may be configured to perform a processing according to S120 of FIG. 4.

Figure 7:
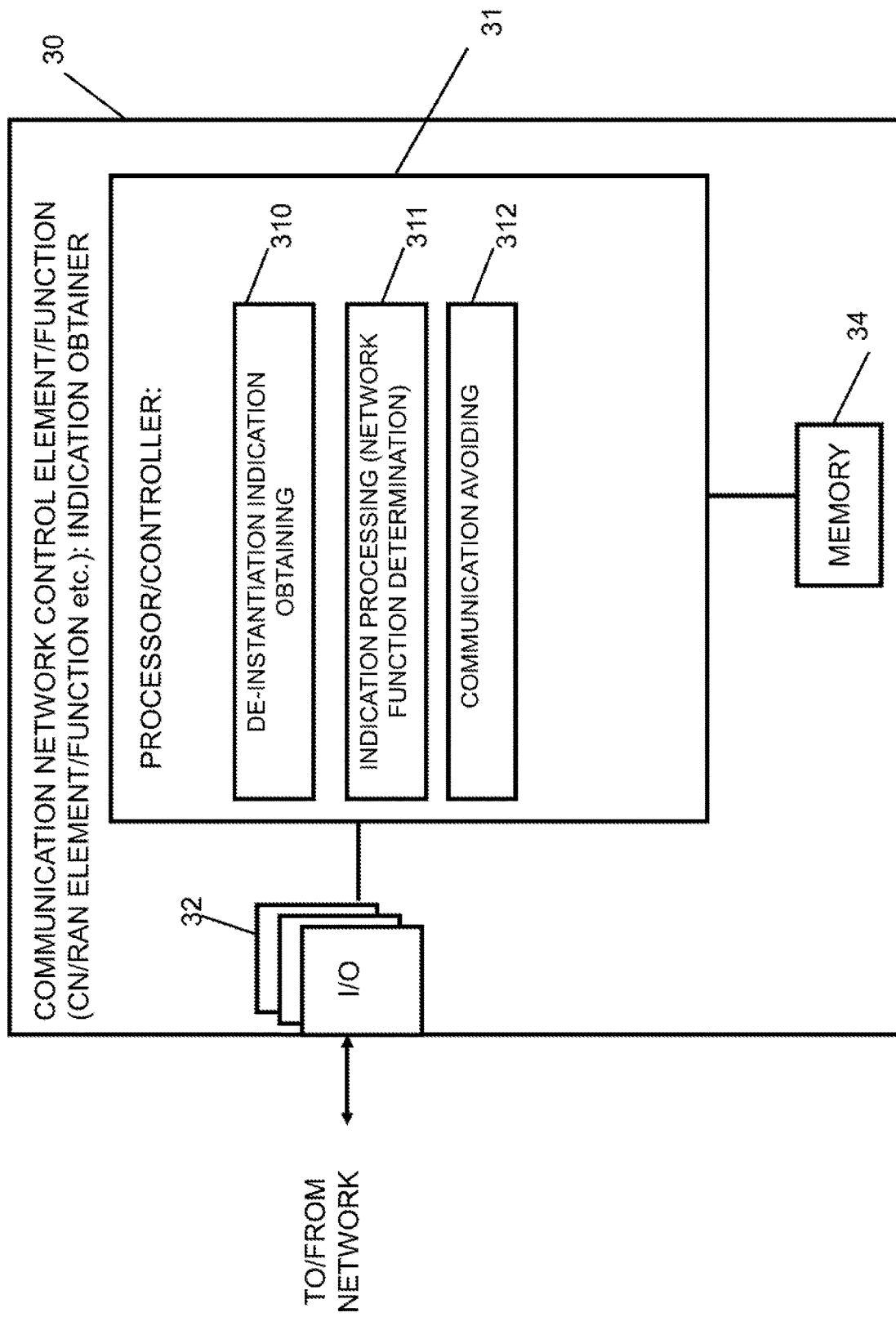
FIG. 7 shows a diagram of a communication network control element or function acting as an indication obtainer according to some examples of embodiments.

FIG. 7 shows a diagram of a communication network control element or function acting as an indication obtainer according to some examples of embodiments, which is configured to implement the control procedure as described in connection with some of the examples of embodiments. It is to be noted that the communication network control element or function, like a physical network element or virtualized network function being a core network control element or function like the MME 30, an access network element like a RAN network element, such as an eNB (e.g. eNB 20) etc., which is shown in FIG. 7, may comprise further elements or functions besides those described herein below. Furthermore, even though reference is made to a communication network control element or function, the element or function may be also another device or function having a similar task, such as a chipset, a chip, a module etc., which can also be part of a communication network control element or function or attached as a separate element or function to a communication network control element or function, or the like. It should be understood that each block and any combination thereof may be implemented by various means or their combinations, such as hardware, software, firmware, one or more processors and/or circuitry.

The communication network control element or function shown in FIG. 7 may comprise a processing function, a control unit or a processor 31, such as a CPU or the like, which is suitable for executing instructions given by programs or the like related to the control procedure. The processor 31 may comprise one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 32 denotes transceiver or input/output (I/O) units or functions (interfaces) connected to the processor or processing function 31. The I/O units 32 may be used for communicating with one or more network elements, such as communication elements like UEs, RAN elements, core network elements or functions, a GO element, an OAM element, an external database and the like. The I/O units 32 may be a combined unit comprising communication equipment towards several network elements, or may comprise a distributed structure with a plurality of different interfaces for different network elements. Reference sign 34 denotes a memory usable, for example, for storing data and programs to be executed by the processor or processing function 31 and/or as a working storage of the processor or processing function 31. It is to be noted that in case a local database for storing information regarding the state of the virtualized network functions is to be provided, a part of memory 34 may be used for this, or a separate storage entity (not shown) may be provided for this purpose. In this case, corresponding information can be written/updated, for example by means of a corresponding signaling from the GO 70.

The processor or processing function 31 is configured to execute processing related to the above described control procedure. In particular, the processor or processing function 31 comprises a sub-portion 310 as a processing portion which is usable for obtaining a de-instantiation indication. The portion 310 may be configured to perform processing according to S200 of FIG. 5. Furthermore, the processor or processing function 31 comprises a sub-portion 311 usable as a portion for processing the indication. The portion 311 may be configured to perform processing according to S210 of FIG. 5. Furthermore, the processor or processing function 31 comprises a sub-portion 312 usable as a portion for avoiding a communication attempt. The portion 312 may be configured to perform a processing according to S220 of FIG. 5.

Next, a further example of embodiments is described.

While the above described examples are related to a configuration where it is determined that a virtualized network function is to be de-instantiated and a corresponding indication is provided to the communication network so as to be obtainable by other network elements or functions, the present examples of embodiments are related to a further approach.

Specifically, an intermediate network element or function (virtualized or physical) is provided. When a virtualized network function (which may be de-instantiated at a later point of time, for example), such as the MME 35, conducts an attach processing for a communication element (UE) of a communication network, it prepares a response to the attach request including first identification data identifying the virtualized network function (MME 35) and second identification data identifying the intermediate network element or network function (which may also referred to as a "light" MME). To this intermediate network element or function, messages related to the virtualized network function (MME 35) are to be directed by other network elements.

Now, when the intermediate network element or function receives such a message directed to the virtualized network function (MME 35), it checks whether the virtualized network function (MME 35) is indicated to be still instantiated or not. In case the result of the check is that the virtualized network function is de-instantiated, a simulation process for replying to the received message on behalf of the de-instantiated virtualized network function is conducted.

According to some examples of embodiments, the check may be based on information like that described in connection with the above described embodiments, i.e. by information provided from the GO 70 and/or retrieved from database 80.

That is, according to the present examples of embodiments, the virtualized network function, such as the MME 35, is configured in such a manner that if it prepares a response to the attach request, e.g. providing identification data (such as a new GUTI), then this new identification data (the new GUTI) includes also identification data which resolve to the intermediate network element or function (the "light" MME). This intermediate network element or function is configured, for example, to simulate a corresponding network function, i.e. it simulates a simple MME which is capable to correctly response to an identification request or the like received from any new MME (e.g. MME 30) and the cancel location procedure from the HSS 60, in case the virtualized MME was de-instantiated.

According to some examples of embodiments, the intermediate network element (e.g. the light MME) is always contacted first. In case the virtualized network function is (still) instantiated, the intermediate network element or function forwards the message (e.g. a request) to the correct MME.

According to some examples of embodiments, the intermediate network element or function is a centralized entity. Furthermore, it may be configured to host all remaining subscription data related to UEs of all virtual network functions which may be de-instantiated, such as virtualized MMEs. Furthermore, a streamlined software or the like is provided in the intermediate network element or function which is simply able to act and respond in accordance to the rules provided for the corresponding virtualized network function (e.g. according to 3GPP standards for an MME), i.e. to act on behalf of the (then) de-instantiated network function.

It is to be noted that according to examples of embodiments, identification data such as addresses or the like for both the virtualized network function and the intermediate network element or function (e.g. for the MME 35 and the light MME) are to be provided in identification data such as the GUTI or by means of a separate information element to be signalled to the UE.

Figure 8:
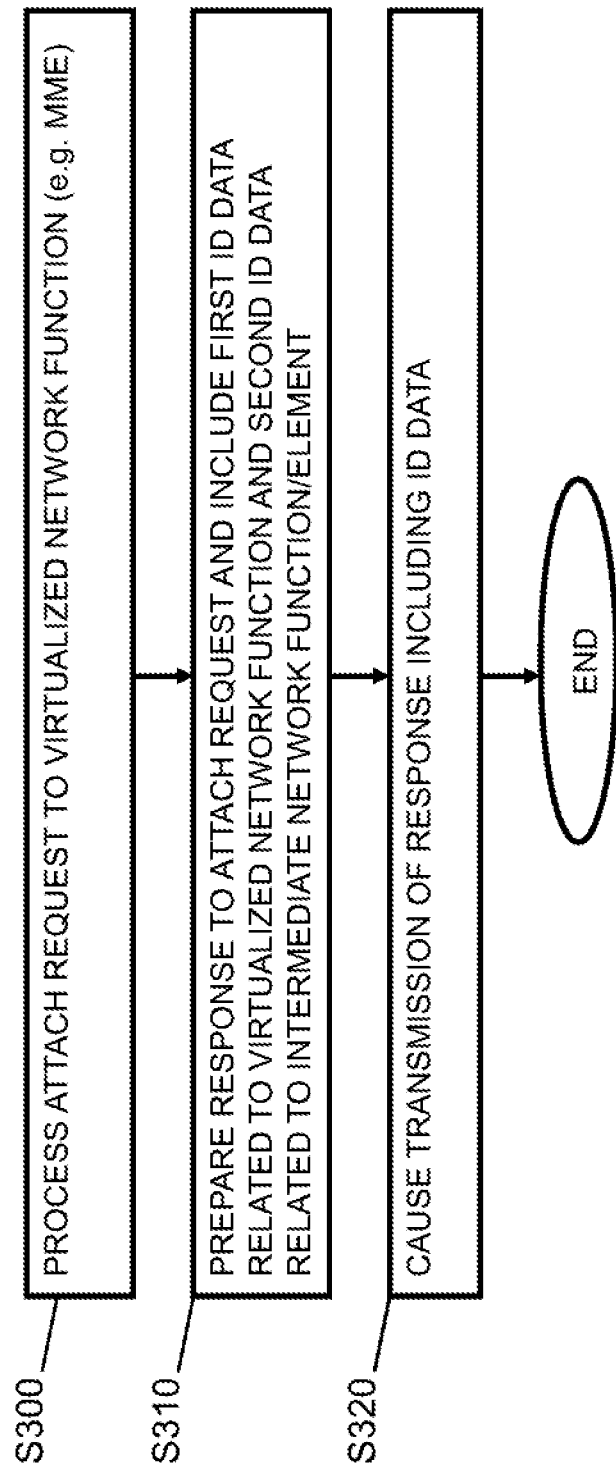
FIG. 8 shows a flow chart of a processing conducted in a communication network control function acting as a virtualized network function according to some examples of embodiments.

FIG. 8 shows a flow chart of a processing conducted in a communication network control function acting as a virtualized network function according to some examples of embodiments, which may be de-instantiated at some (unknown) point of time. For example, the processing is executed by a virtualized network function providing services related to a communication network, e.g. related to a communication network control function of the communication network (e.g. core network function, access network function, IMS network function, etc.).

In S300, an attach request e.g. from a communication element of a communication network, like a UE, for attaching to the virtualized network function is received and processed.

In S310, a response to the attach request is prepared. According to some examples of embodiments, in the preparation of the response, first identification data identifying the virtualized network function are included. Furthermore, second identification data identifying an intermediate network element or network function are included, wherein the intermediate network element or network function is related to the virtualized network function, and wherein messages being related to the virtualized network function are to be directed thereto.

According to some examples of embodiments, the first and second identification data are included in identification data such as a GUTI assigned to the requesting UE, wherein the second identification data resolve to the intermediate network element or network function.

In S320, a transmission of the response to the requesting communication element is caused.

Figure 9:
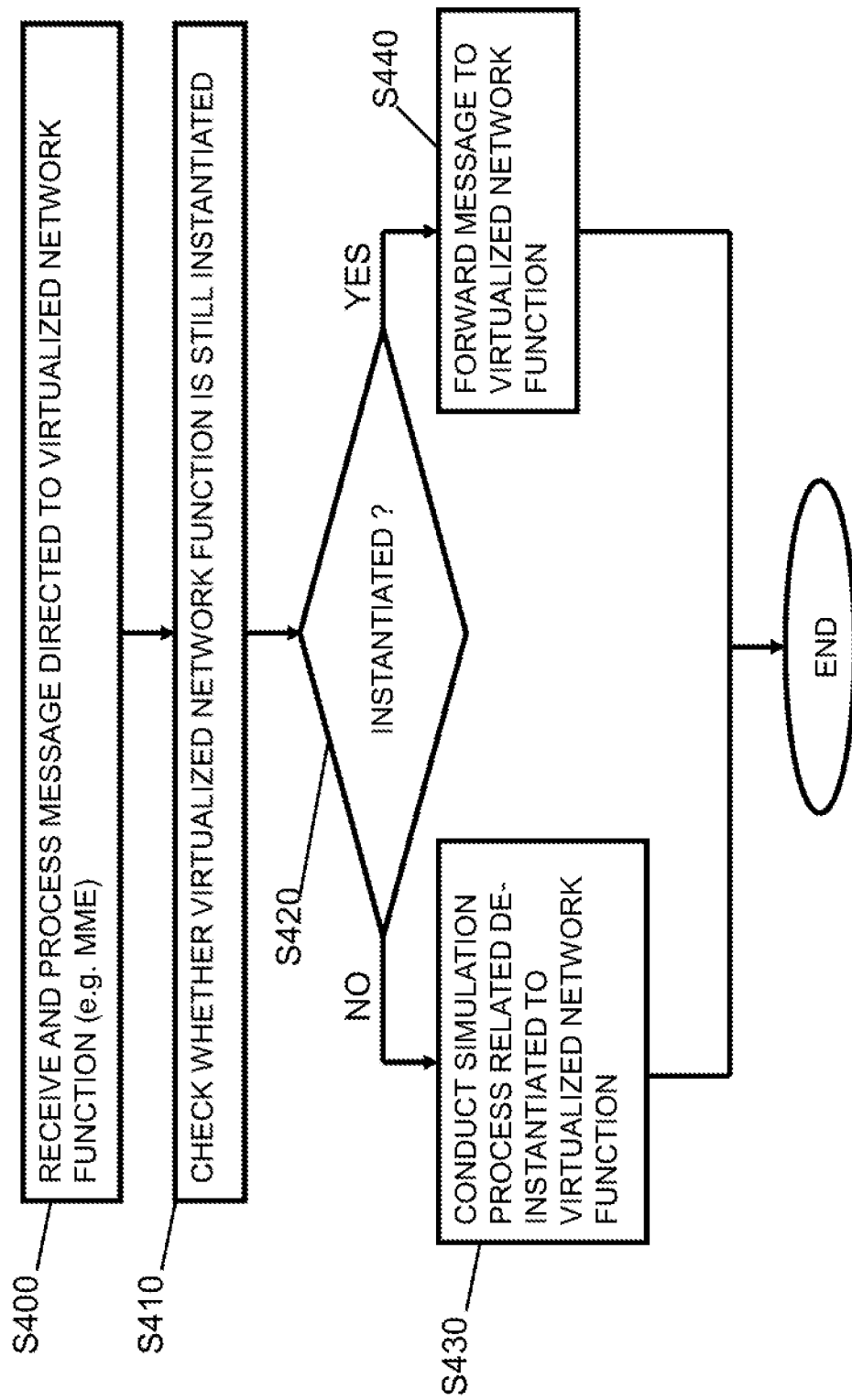
FIG. 9 shows a flow chart of a processing conducted in a communication network control element or function acting as an intermediate network element or function according to some examples of embodiments.

FIG. 9 shows a flow chart of a processing conducted in a communication network control element or function acting as an intermediate network element or function according to some examples of embodiments. Specifically, the intermediate network element or function may be related to a virtualized network function which may be de-instantiated at some (unknown) point of time, wherein the virtualized network function may provide services related to a communication network, for example it may be related to a communication network control function of the communication network (e.g. core network function, access network function, IMS network function, etc.). The processing may be executed, for example, by a communication network control element or communication network control function acting as the intermediate network element or intermediate network function.

In S400, a message directed to a virtualized network function is received and processed. According to some examples of embodiments, the message directed to the virtualized network function is received from one of a communication element comprising a terminal device or UE capable of communicating in the communication network, a RAN network element or network function of the communication network, and a network element or network function of a core network part of the communication network.

In S410, it is checked whether the virtualized network function is indicated to be still instantiated or not. According to some examples of embodiments, the check is based on that subscription data of communication elements of the communication network attached to virtualized network functions are hosted. Furthermore, indications for virtualized network functions are stored which indicate whether the virtualized network functions are de-instantiated or not.

In S420, the check is evaluated. In case the result of the check is that the virtualized network function is de-instantiated (NO in S420), the processing proceeds to S430. Otherwise, in case the result of the check is that the virtualized network function is (still) instantiated (YES in S420), the processing proceeds to S440.

In S430, a simulation process for replying to the received message on behalf of the (de-instantiated) virtualized network function is conducted. For example, according to examples of embodiments, the simulation process comprises replying to the received message on behalf of the de-instantiated virtualized network function on the basis of the stored subscription data.

Otherwise, in S440, the received message is forwarded to the virtualized network function.

Then, the processing is ended.

Figure 10:
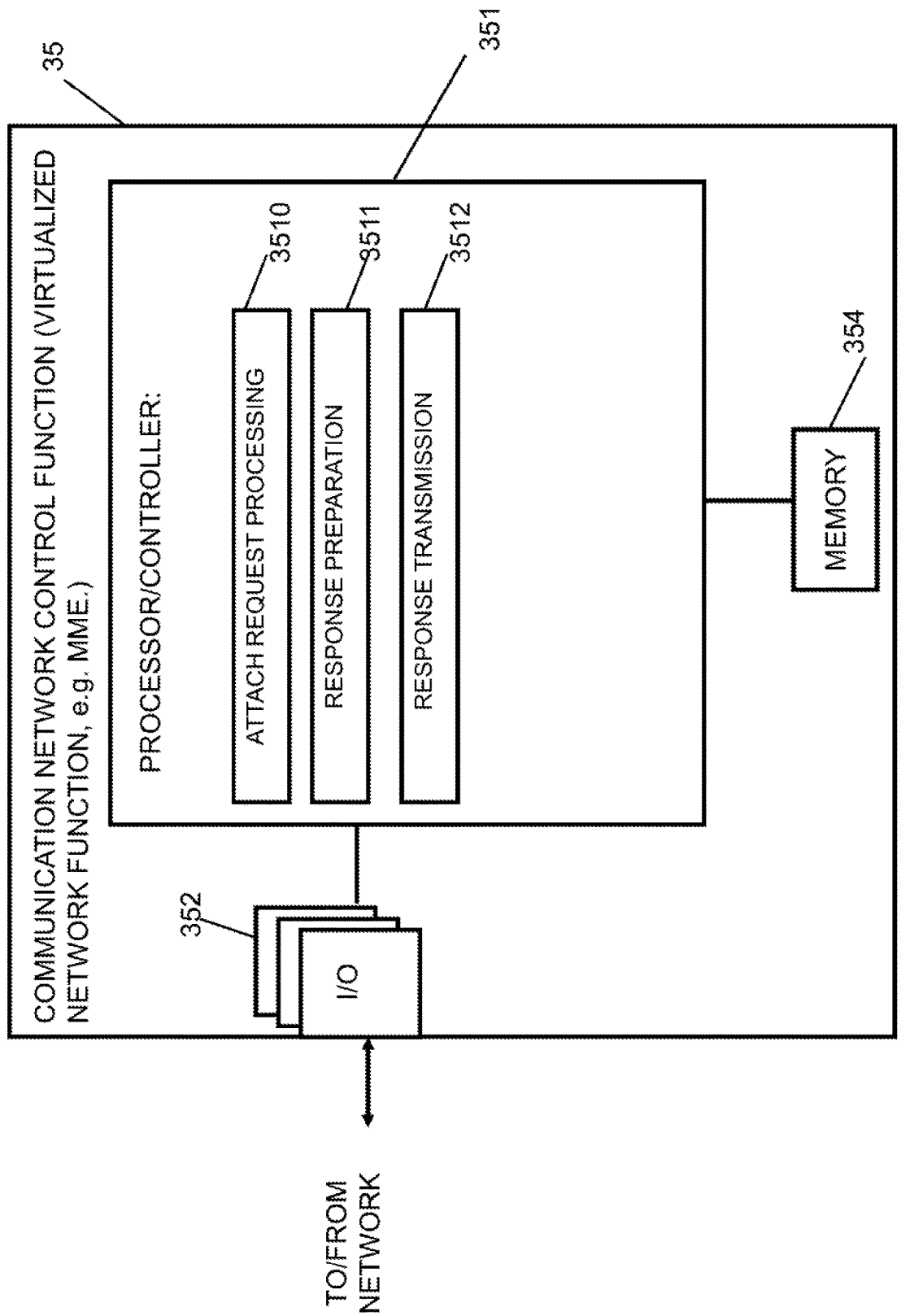
FIG. 10 shows a diagram of a communication network control function acting as a virtualized network function according to some examples of embodiments.

FIG. 10 shows a diagram of a communication network control function acting as a virtualized network function according to some examples of embodiments, which is configured to implement a control procedure as described in connection with some of the examples of embodiments. It is to be noted that the virtualized network function, like a communication network control function of the communication network (e.g. core network function, access network function, IMS network function, etc.), e.g. a core network control function like the MME 35 etc., which is shown in FIG. 10, may comprise further functions besides those described herein below. Furthermore, even though reference is made to a communication network control function, the function may be also another function having a similar task, such as a module etc., which can also be part of a communication network control function or attached as a separate function to a communication network control function, or the like. It should be understood that each block and any combination thereof may be implemented by various means or their combinations, such as hardware, software, firmware, one or more processors and/or circuitry.

The communication network control function shown in FIG. 10 may comprise a processing function, a control unit or a processor 351, such as a CPU or the like, which is suitable for executing instructions given by programs or the like related to the control procedure. The processor 351 may comprise one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 352 denotes transceiver or input/output (I/O) units or functions (interfaces) connected to the processor or processing function 351. The I/O units 352 may be used for communicating with one or more network elements, such as communication elements like UEs, RAN elements, core network elements or functions, a GO element, an OAM element and the like. The I/O units 352 may be a combined unit comprising communication equipment towards several network elements, or may comprise a distributed structure with a plurality of different interfaces for different network elements. Reference sign 354 denotes a memory usable, for example, for storing data and programs to be executed by the processor or processing function 351 and/or as a working storage of the processor or processing function 351.

The processor or processing function 351 is configured to execute processing related to the above described control procedure. In particular, the processor or processing function 351 comprises a sub-portion 3510 as a processing portion which is usable for processing an attach request. The portion 3510 may be configured to perform processing according to S300 of FIG. 8. Furthermore, the processor or processing function 351 comprises a sub-portion 3511 usable as a portion for preparing a response. The portion 3511 may be configured to perform processing according to S310 of FIG. 8. Furthermore, the processor or processing function 351 comprises a sub-portion 3512 usable as a portion for transmitting a response. The portion 3512 may be configured to perform a processing according to S320 of FIG. 8.

Figure 11:
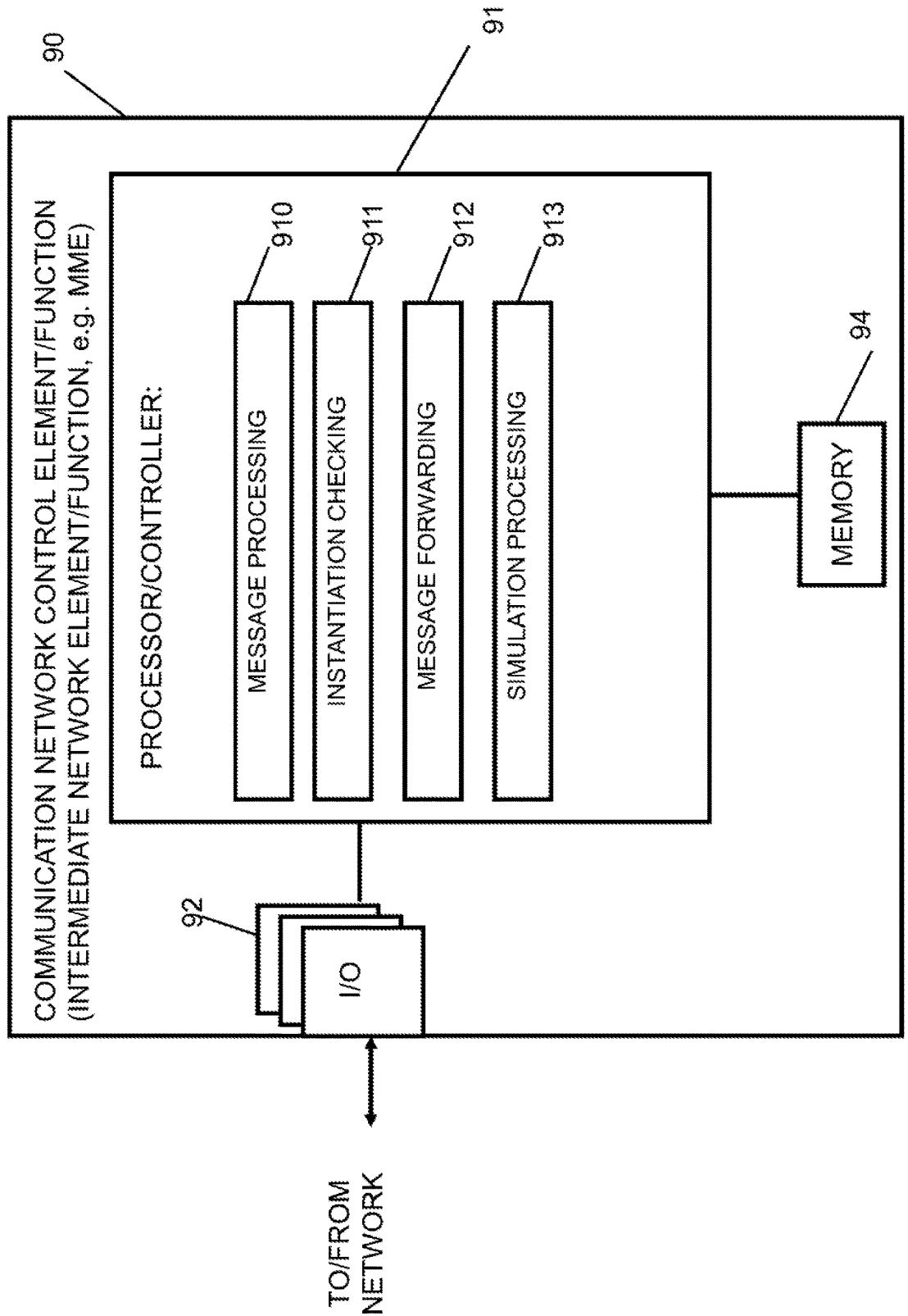
FIG. 11 shows a diagram of a communication network control element or function acting as an intermediate network element or function according to some examples of embodiments.

FIG. 11 shows a diagram of a communication network control element or function acting as an intermediate network element or function according to some examples of embodiments, which is configured to implement the control procedure as described in connection with some of the examples of embodiments. It is to be noted that the communication network control element or function, like a physical network element or virtualized network function being a core network control element or function, which is shown in FIG. 11, may comprise further elements or functions besides those described herein below. Furthermore, even though reference is made to a communication network control element or function, the element or function may be also another device or function having a similar task, such as a chipset, a chip, a module etc., which can also be part of a communication network control element or function or attached as a separate element or function to a communication network control element or function, or the like. It should be understood that each block and any combination thereof may be implemented by various means or their combinations, such as hardware, software, firmware, one or more processors and/or circuitry.

The communication network control element or function 90 shown in FIG. 11 may comprise a processing function, a control unit or a processor 91, such as a CPU or the like, which is suitable for executing instructions given by programs or the like related to the control procedure. The processor 91 may comprise one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 92 denotes transceiver or input/output (I/O) units or functions (interfaces) connected to the processor or processing function 91. The I/O units 92 may be used for communicating with one or more network elements, such as communication elements like UEs, RAN elements, core network elements or functions, a GO element, an OAM element and the like. The I/O units 92 may be a combined unit comprising communication equipment towards several network elements, or may comprise a distributed structure with a plurality of different interfaces for different network elements. Reference sign 94 denotes a memory usable, for example, for storing data and programs to be executed by the processor or processing function 91 and/or as a working storage of the processor or processing function 91.

The processor or processing function 91 is configured to execute processing related to the above described control procedure. In particular, the processor or processing function 91 comprises a sub-portion 910 as a processing portion which is usable for processing a message (e.g. Identification Request). The portion 910 may be configured to perform processing according to S400 of FIG. 9. Furthermore, the processor or processing function 91 comprises a sub-portion 911 usable as a portion for checking an instantiation state. The portion 911 may be configured to perform processing according to S910 of FIG. 9. Furthermore, the processor or processing function 91 comprises a sub-portion 912 usable as a portion for forwarding the message. The portion 912 may be configured to perform a processing according to S440 of FIG. 9. Additionally, the processor or processing function 91 comprises a sub-portion 913 usable as a portion for conducting a simulation processing. The portion 913 may be configured to perform a processing according to S430 of FIG. 9.

According to an example of embodiments, there is provided an apparatus comprising means for determining that at least one virtualized network function providing services related to a communication network is to be de-instantiated, means for preparing an indication related to the de-instantiation of the at least one virtualized network function, and means for causing transmission of the prepared indication to at least one of a network element of the communication network, a network function of the communication network and a database to which network elements or network functions of the communication network have access.

According to another example of embodiments, there is provided an apparatus comprising means for obtaining an indication related to a de-instantiation of at least one virtualized network function providing services related to a communication network, and means for processing the obtained indication for determining or recognizing the virtualized network function being de-instantiated and for avoiding to conduct a communication attempt to the virtualized network function to be de-instantiated.

According to still another example of embodiments, there is provided an apparatus comprising means for receiving and processing an attach request from a communication element of a communication network for attaching to a virtualized network function providing services related to the communication network, means for preparing a response to the attach request, and means for causing transmission of the response to the requesting communication element, wherein the preparing of the response comprises including first identification data identifying the virtualized network function and second identification data identifying an intermediate network element or network function being related to the virtualized network function and to which messages related to the virtualized network function are to be directed.

According to yet another example of embodiments, there is provided an apparatus comprising means for receiving and processing a message directed to a virtualized network function providing services related to a communication network, means for checking whether the virtualized network function is indicated to be still instantiated or not, and means for conducting, in case the result of the check is that the virtualized network function is de-instantiated, a simulation process for replying to the received message on behalf of the de-instantiated virtualized network function.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C #, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module comprising such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, comprising a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

For example, while in the above described examples of embodiments an MME is used as an example for the virtualized network function to be de-instantiated, the invention is not limited thereto. For example, other network entities such as, SGSN, GGSN, SGW, PGW, SGW-C, SGW-U, PGW-C, PGW-U etc., or a RAN element like an eNB may be used as examples of a virtualized network function to which the described examples of embodiments are applicable. As indicated above, examples of embodiments of the invention are also applicable for other network systems, such as an IMS based system, where elements like a P-CSCF, IBCF, BGCF, MGCF etc may be instantiated as virtualized network functions where examples of embodiments of the invention are applicable.

The invention claimed is:

1. An apparatus comprising:
at least one processor, and
at least one memory for storing instructions to be executed by the processor, wherein
the at least one memory and the instructions are configured to, with the at least one processor, cause the apparatus at least to:
obtain an indication related to a de-instantiation of at least one virtualized network function providing services related to a communication network, wherein the at least one virtualized network function to be de-instantiated is a party in the communication network being different to the party of the communication network where the apparatus is included, and wherein the indication is obtained from a communication network control element or communication network control function being different to the at least one virtualized network function to be de-instantiated and being different to the party where the apparatus is included, and
process the obtained indication for determining or recognizing the virtualized network function being de-instantiated and for avoiding to conduct a communication attempt to the virtualized network function to be de-instantiated when continuing a communication in the communication network after the de-instantiation of the at least one virtualized network function,
wherein the indication related to the de-instantiation of the at least one virtualized network function is obtained from one of
a communication network control element or communication network control function acting as a global orchestrator for implementing virtualized network functions, and
an operation and maintenance element of the communication network.

2. The apparatus according to claim 1, wherein the at least one memory and the instructions are further configured to, with the at least one processor, cause the apparatus at least to:
obtain, as the indication related to the de-instantiation of the at least one virtualized network element, an identification information indicating that the at least one virtualized network element to be de-instantiated is de-instantiated and not available anymore.

3. The apparatus according to claim 2, wherein the at least one memory and the instructions are further configured to, with the at least one processor, cause the apparatus at least to:
check, when a communication attempt is to be conducted to a network element or network function of the communication network, whether the network element or network function is indicated in the identification information indicating the at least one virtualized network element to be de-instantiated as being de-instantiated and not available anymore, and
in case the result of the check is affirmative,
skip immediately the communication attempt to the virtualized network function being de-instantiated.

4. The apparatus according to claim 1, wherein the at least one memory and the instructions are further configured to, with the at least one processor, cause the apparatus at least:
query a database to which network elements or network functions of the communication network have access, wherein the database is comprised in at least one of a centralized database of the communication network and a local database comprised in one or more of the network elements or network functions of the communication network, wherein the indication related to a de-instantiation of at least one virtualized network function is obtained from the database.

5. The apparatus according to claim 1, wherein
the apparatus is implemented by one of a communication element comprising a terminal device or user equipment capable of communicating in the communication network, a network element or network function of a radio access network part of the communication network, and a network element or network function of a core network part of the communication network, wherein the virtualized network function to be de-instantiated is related to a communication network control function of the communication network.

6. A method, comprising:

obtaining an indication related to a de-instantiation of at least one virtualized network function providing services related to a communication network, wherein the at least one virtualized network function to be de-instantiated is a party in the communication network being different to the party of the communication network where the apparatus is included, and wherein the indication is obtained from a communication network control element or communication network control function being different to the at least one virtualized network function to be de-instantiated and being different to the party where the apparatus is included, and processing the obtained indication for determining or recognizing the virtualized network function being de-instantiated and for avoiding to conduct a communication attempt to the virtualized network function to be de-instantiated when continuing a communication in the communication network after the de-instantiation of the at least one virtualized network function, wherein the indication related to the de-instantiation of the at least one virtualized network function is obtained from one of a communication network control element or communication network control function acting as a global orchestrator for implementing virtualized network functions, and an operation and maintenance element of the communication network.

7. The method according to claim 6, further comprising obtaining, as the indication related to the de-instantiation of the at least one virtualized network element, an identification information indicating that the at least one virtualized network element to be de-instantiated is de-instantiated and not available anymore.

8. The method according to claim 7, further comprising:

checking, when a communication attempt is to be conducted to a network element or network function of the communication network, whether the network element or network function is indicated in the identification information indicating the at least one virtualized network element to be de-instantiated as being de-instantiated and not available anymore; and in case the result of the check is affirmative, skipping immediately the communication attempt to the virtualized network function being de-instantiated.

9. The method according to claim 6, further comprising querying a database to which network elements or network functions of the communication network have access, wherein the database is comprised in at least one of a centralized database of the communication network and a local database comprised in one or more of the network elements or network functions of the communication network, wherein the indication related to a de-instantiation of at least one virtualized network function is obtained from the database.

10. The method according to claim 6, wherein the method is executed by one of a communication element comprising a terminal device or user equipment capable of communicating in the communication network, a network element or network function of a radio access network part of the communication network, and a network element or network function of a core network part of the communication network, wherein the virtualized network function to be de-instantiated is related to a communication network control function of the communication network.

11. A non-transitory computer-readable medium storing instructions that, when executed by a processing device, cause the processing device to perform:

obtaining an indication related to a de-instantiation of at least one virtualized network function providing services related to a communication network, wherein the at least one virtualized network function to be de-instantiated is a party in the communication network being different to the party of the communication network where the computer program product is implemented, and wherein the indication is obtained from a communication network control element or communication network control function being different to the at least one virtualized network function to be de-instantiated and being different to the party where the computer program product is implemented; and processing the obtained indication for determining or recognizing the virtualized network function being de-instantiated and for avoiding to conduct a communication attempt to the virtualized network function to be de-instantiated when continuing a communication in the communication network after the de-instantiation of the at least one virtualized network function, wherein the indication related to the de-instantiation of the at least one virtualized network function is obtained from one of a communication network control element or communication network control function acting as a global orchestrator for implementing virtualized network functions, and an operation and maintenance element of the communication network.

* * * * *